June 5, 1923.

J. HAMELIN

SPRING WHEEL

Filed Sept. 28, 1921

1,457,433

Inventor
Joseph Hamelin

By

Attorney

Patented June 5, 1923.

1,457,433

UNITED STATES PATENT OFFICE.

JOSEPH HAMELIN, OF BIENVILLE, QUEBEC, CANADA, ASSIGNOR, BY MESNE ASSIGNMENTS, OF ONE-HALF TO ANTOINE HAMELIN, OF BIENVILLE, QUEBEC, CANADA.

SPRING WHEEL.

Application filed September 28, 1921. Serial No. 503,731.

*To all whom it may concern:*

Be it known that I, JOSEPH HAMELIN, a British subject, residing at Bienville, in the Province of Quebec, in the Dominion of Canada, have invented certain new and useful Improvements in Spring Wheels; and I do hereby declare that the following is a true, clear, and correct description of the same.

The present invention relates to improvements in resilient vehicle wheels; and more particularly to wheels of the so-called disk type, in which the usual spokes are replaced by a circular steel plate or disk which encircles the hub and is secured at its inner edge thereto and at its outer edge to the rim. The invention has special reference to vehicle wheels which depend for their resilience, not upon the use of pneumatic tires, but upon cushioning springs or devices which are arranged to act upon the rim so as to enable a relative movement between the latter and the parts or devices by which it is carried, in this instance the disk.

The invention contemplates the provision of a specially constructed carrier for the cushioning springs, comprising two telescopically-related members, one of which is formed in part by the disk itself and in part by a plate secured thereto; the other member of the carrier being secured to the rim. This arrangement enables all of the advantages of the disk type of wheels to be retained, while enabling the use of solid tires instead of pneumatic or cushion tires, so that a comparatively simple and inexpensive wheel is obtained which still possesses a high degree of strength and resilience.

An embodiment of the invention is illustrated in the accompanying drawing, in which:—

Like numerals of reference indicate corresponding parts in each figure.

Figure 1:
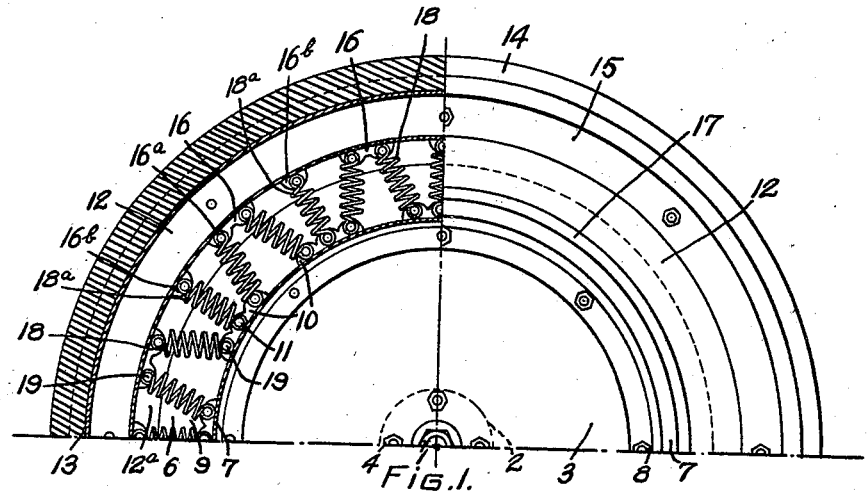
Figure 1 is a side elevation of half a wheel, a portion being shown in section.
Figure 2:
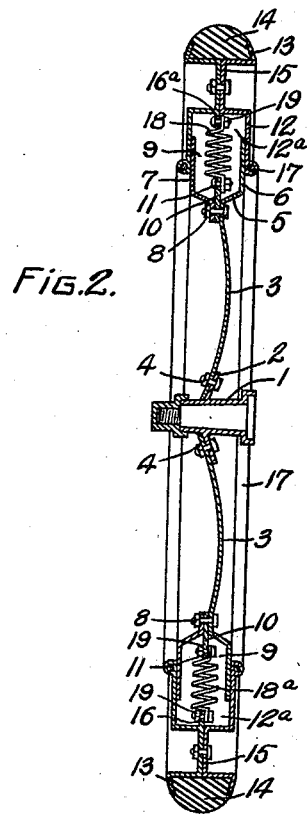
Figure 2 is a cross section through the wheel.

Referring to the drawings, 1 is the hub of the wheel, said hub having a circumferential integral rib 2 therearound, and 3 is a circular concave plate or disk which fits over said hub 1 and is secured to the rib 2 by means of the bolts 4. The said concave plate adjacent its outer circumference is bent laterally at 5 and projects again vertically at 6. An annular plate 7 bent similarly to the portions 5 and 6 of the plate 3 is secured by means of bolts 8 on the opposite side of said plate 3 to unite therewith in forming a circumferential channel member 9 at the edge of said plate 3. In between said plates 7 and 3 is secured a plurality of suitably distanced lugs 10 having each three holes 11 therein. The said lugs 10 project within the channel member 9.

Over said channel member 9 is mounted a member 12, which is trough-shaped or channel shaped in cross-section so as to be capable of a sliding fit; and 13 is an annular rim member formed to hold the tire 14, the members 12 and 13 being connected together by the central web 15. Within the interior chamber $12^a$ of the outer channel member 12 project the lugs 16 and $16^b$ which are suitably distanced from one another. The said lugs 16 have holes $16^a$ and are preferably disposed in staggered relation to the lugs 10 and in alternation with the lugs $16^b$, which latter are disposed opposite the central holes 11 in lugs 10 on the inner channel member 9. The outer edges 17 of the side walls of the member 12 are rolled for re-inforcing purposes. Within said members 9 and 12 are mounted the spiral springs 18 and $18^a$ which are secured to the lugs 10, 16 and $16^b$ by the bolts 19 which pass through the holes 11 and $16^a$. The springs $18^a$ are preferably disposed radially, and are secured to the lugs $16^b$ at one end and at their other end to the central holes 11 in lugs 10. The springs 18 are disposed obliquely in relation to the springs $18^a$ and are secured to the lugs 16 and in the outer holes 11 of the lugs 10. The result is that a plurality of springs will have a vertical pull while a plurality of other springs will have an oblique pull.

What I claim as my invention is:—

In a resilient disk wheel, the combination of a hub; a disk encircling the hub and secured thereto, said disk having its outer peripheral portion laterally offset; an offset annular plate secured to said disk immediately adjacent the offset portion thereof to conjointly form with such portion an annular member of channel-section; a second annular member of channel-section slidably related to the first member; cushioning means interposed between the two channel members and connected to the same; an annular rim encircling and secured to the second channel member; and a tire on said rim.

Signed at Bienville, Que., Canada, this 13th day of July, 1921.

JOSEPH HAMELIN.

Witnesses:
C. GUAY,
ANT. HAMELIN.